Nov. 7, 1961  D. B. PALL  3,007,579
FILTER STRUCTURE
Filed June 16, 1958  3 Sheets-Sheet 1

INVENTOR.
DAVID B. PALL
BY
Brumbaugh, Free, Graves & Donohue
his ATTORNEYS

Nov. 7, 1961　　　　D. B. PALL　　　　3,007,579
FILTER STRUCTURE
Filed June 16, 1958　　　　　　　　　　　3 Sheets-Sheet 2
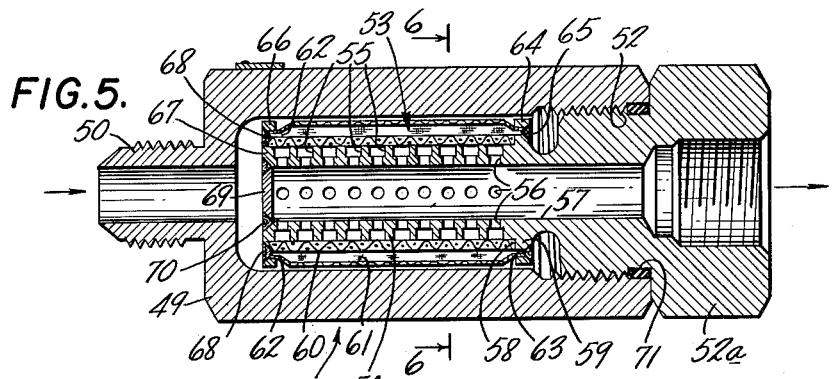
FIG. 5.
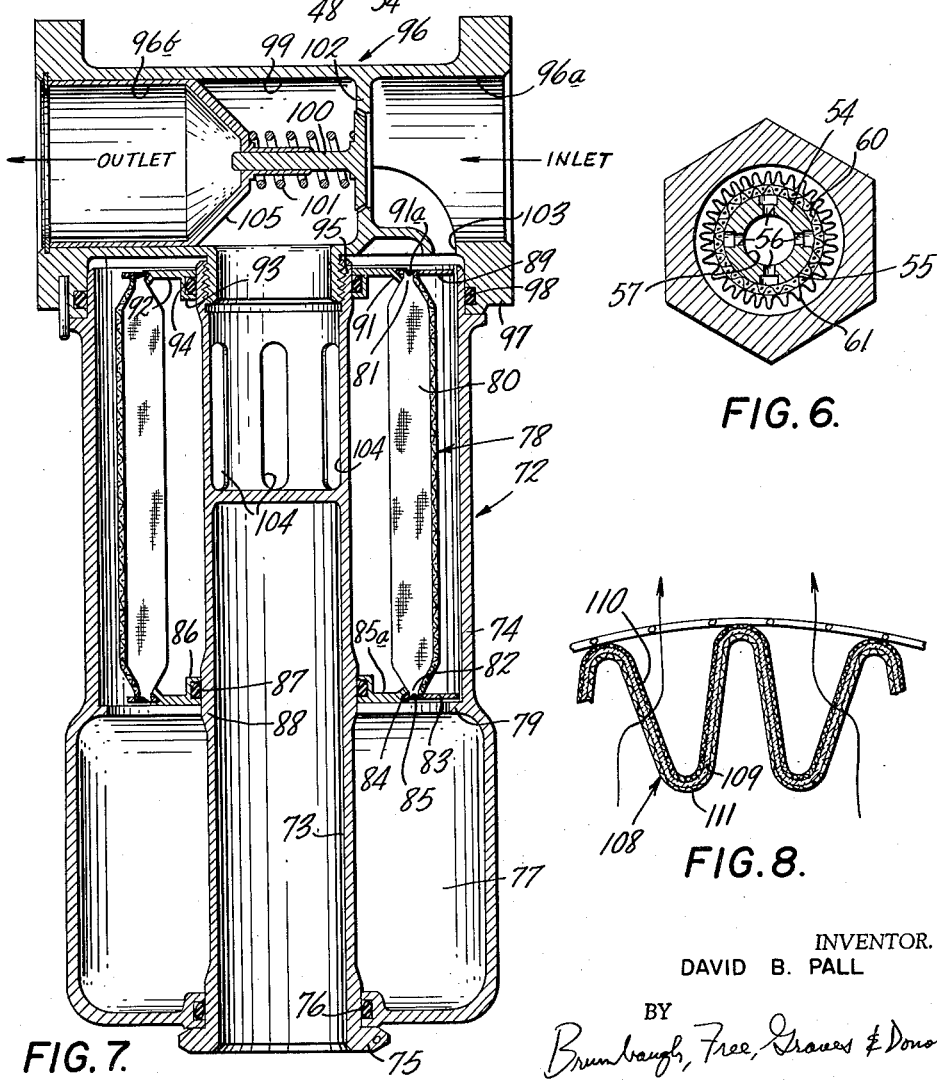
FIG. 6.
FIG. 7.
FIG. 8.
INVENTOR.
DAVID B. PALL
BY
Brumbaugh, Free, Graves & Donohue
his ATTORNEYS.

Nov. 7, 1961

D. B. PALL 3,007,579

FILTER STRUCTURE

Filed June 16, 1958

INVENTOR.
DAVID B. PALL
BY
Brumbaugh, Free, Graves & Donohue
his ATTORNEYS.

United States Patent Office 3,007,579
Patented Nov. 7, 1961

3,007,579
FILTER STRUCTURE
David B. Pall, Roslyn Heights, N.Y., assignor to Pall Corporation, Glen Cove, N.Y., a corporation of New York
Filed June 16, 1958, Ser. No. 742,156
12 Claims. (Cl. 210—489)

This is a continuation-in-part of U.S. application S.N. 625,445, filed November 30, 1956.

This invention relates to filters and, more particularly, to filter structures including a tubular filtering element integrated physically and functionally with its companion parts in a filter assembly.

Filter assemblies using wire mesh filter elements, particularly of the corrugated type, characteristically utilize frictional clamping, resinous bonds, or both, at the juncture between the filter element and the rest of the assembly. In many cases, the clamping action is augmented by the use of rubber gaskets. Direct frictional clamping is unsatisfactory, particularly in high pressure installations, because it is unpredictable in its behavior under the random stresses applied in use and there is a tendency for leakage paths to occur which exceed the pore size of the basic filter element. Resinous bonds are structurally weak and incapable of withstanding the high temperatures which occur in many present day applications such, for example, as in high speed airborne equipment. Gaskets formed of rubber or the like require continuous compression to maintain their effectiveness, therefore making locked-in stresses essential. Also, such gasket materials are in general incapable of withstanding heat over extended intervals without loss of sealing efficiency.

In accordance with the present invention, therefore, there are provided filter assemblies in which filter elements, preferably of corrugated wire mesh, are joined to the other parts of the filter assembly in a stress-free, liquid-tight joint so constituted that the filter element itself can impart structural rigidity to the assembly, transmitting forces of both tension and compression as might be imposed on the assembly in use. In one preferred arrangement, a wire mesh sheet is corrugated and bent into a tubular configuration to be sealed against itself by welding. The ends of the tubular configuration are compressed to form uniformly dense margins which are fitted between radially opposed surfaces as provided, for example, by a pair of concentric rings after which a metal weld is applied either by melting existing metal in the area of the joints or by the addition of metal, or both. The completed joint is stress-free in that there are no compression forces between the opposed surfaces of the rings which embrace the densified margins of the filter element and the joints can be made fully liquid-tight against leakage even under applied pressures of extreme magnitude. The filter element thus becomes a structural coupling both between opposite ends of the unit and between the assembled parts at each end of the unit. The basic integrated structure can be modified in various ways to accommodate various design requirements. Thus, for example, either the outer or inner ring part which make up the joint at one end of the tubular filter element can be formed integrally with various coupling elements, supplementary support elements, relief valve assemblies, or the like.

Also, the tubular filter element may comprise a fibrous mat sandwiched between two layers of wire mesh and corrugated in the manner described above. In another form of the invention, the filter element includes a finely divided unbonded fibrous mat filter upstream from the wire mesh and an intermediate membrane filter adapted to trap any fibers from the mat which might tend to move downstream.

Representative embodiments of the invention from which the above and other features and objects will be readily apparent are described below having reference to the accompanying drawings in which:

FIGURE 5 is a view in longitudinal section of a filter assembly of the in-line type adapted to withstand extremely high pressures and temperatures;

FIGURE 6 is a view in transverse section taken on the line 6—6 of FIGURE 5 looking in the direction of the arrows;

FIGURE 7 is a view in longitudinal section of a typical fuel filter assembly including sumps and relief valve means and in which a filter element with integrated end fittings is locked in position;

FIGURE 8 is an enlarged fragmentary view similar to that of FIGURE 2 showing a sandwiched fiber mat structure;

Figure 1:
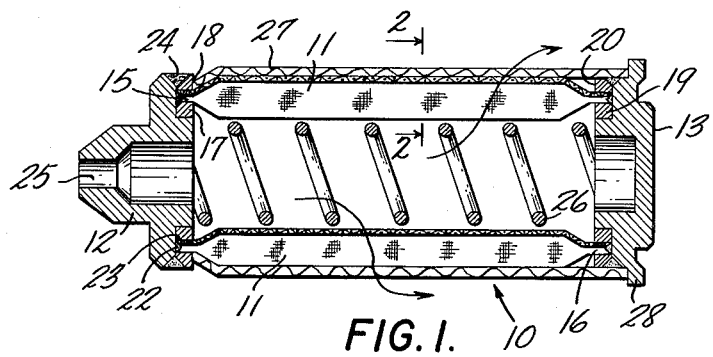
FIGURE 1 is a view in longitudinal section of a filter assembly in which the filter elements themselves form the structural connection between the fittings secured to the ends.
Figure 2:
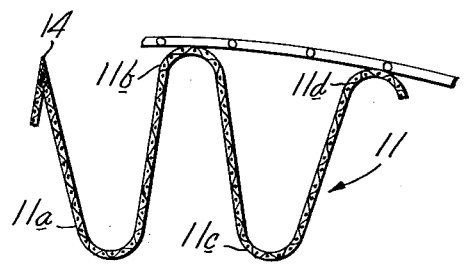
FIGURE 2 is an enlarged fragmentary view in transverse section taken on the line 2—2 of FIGURE 1 looking in the direction of the arrows.

Referring first to FIGURES 1 and 2, the invention is illustrated as embodied in a filter assembly 10 which is adapted to be mounted as a unit in a hydraulic system such, for example, as a fuel system, a hydraulic servo system, or the like, and which includes a basic filter element 11 in tubular form and having joined permanently to its respective ends, end fittings 12 and 13. The filter element 11 is constituted basically of a woven wire mesh sheet, preferably made in accordance with the disclosure of the copending application Serial No. 562,127, filed January 30, 1956, now Patent No. 2,925,650. In accordance with that disclosure, woven wire mesh is subjected to both mechanical compressing and sintering operations to flatten the wires in the mesh surfaces and, at the crossover points of the wires, to form enlarged contiguous areas, the latter being fused or bonded by the sintering operation. Wire mesh filtering surfaces of this type are useful over an extremely large range of temperatures, say from −320° to above 1000 F., the latter being the temperature which the hydraulic systems of aircraft and missiles can attain. While the invention of the copending application results in a filtering sheet per se which can be subjected to high temperatures as well as high pressures with excellent filtering action, the present invention is concerned with the integration of the basic filtering sheets into working filter assemblies or units in which the several joints and junctions are, like the porous sheet material itself, able to withstand extreme temperatures and pressures. A typical filter element 11 for the assembly of FIGURES 1 and 2 is made up of a 10 micron "Rigimesh," the trademark under which the product of said copending application is sold, sheet formed into corrugations 11a, 11b, 11c, 11d, etc., approximately 0.16 inch in depth and, so corrugated, bent into tubular form, in this case cylindrical, with an outside diameter of approximately 0.75 inch and joined where the two ends are brought together in a single welded seam 14, preferably formed by resistance welding. There are approximately 33 corrugations over the circumference of the filter element 11.

At its respective ends, the tubular filter element 11 is compressed or crimped across the depth of its corrugations to form dense, compacted end margins 15 and 16, respectively. The ends are compacted to a thickness usually not less than half the depth of the corrugations and to a point at which the density is approximately 35% or more of the density of the metal wires of which the filter sheet is fabricated. The compacted end 15 is fitted into the generally toroidal space between the radially opposed surfaces of a pair of concentric rings 17 and 18, and the end 16 is correspondingly fitted in the space between the opposed surfaces of a pair of concentric rings 19 and 20. The rings 17 and 18 and the end 15 of the filter element 11 are permanently joined by means of a continuous, circular weld 22, preferably of the Heliarc type.

The end piece 12 is formed with a circumferential notch 23 which receives the end sub-assembly comprised of the rings 17 and 18 and the end 15 of the filter element 11, and the two are joined by a circular weld 24. The end piece 12 is also formed with an axial opening 25 communicating with the inside surfaces of the tubular filter element 11. The other end sub-assembly includes the rings 19 and 20 embracing the compacted end 16 of the filter element, the three being welded together and received in and welded to the grooved end piece 13 which closes off the end of the filter element. The filter assembly 10 is completed by means of a gently compressed, steeply pitched coil spring 26 to buttress, in cases of extreme stress, the filter element 11, and by an overlying wire mesh sheet 27 wrapped about the filter element 11 and received at one end in a notched shoulder 28 in the end piece 13 and terminated at its other end by following the inwardly converging contour of the compressed end margin 15 of the filter element 11 to abut against the end surface of the ring 18. The overlying filter sheet 27 can, depending on the ultimate use to which the unit is to be put, have a pore size less than, equal to, or greater than, that of the filter element 11.

Preferably, all of the elements of the filter assembly 10 are formed of the same metal, or in any case of compatible, weldable metals of the same general coefficient of expansion. Various grades of stainless steel afford good results. In use, the filter assembly 10 is mounted in a hydraulic system with the liquid flow passing from the center of the tubular filter unit 11 radially outwardly. The nature of the wire mesh filter element is such that it is capable of withstanding a considerable pressure differential without other supporting or backing up members as part of the filter assembly. It will be observed that the end portions 12 and 13 are united only through the agency of the filter element. Also, it will be observed that the compressed ends are centered between the extreme amplitudes of the corrugations, that is to say the ends are compressed symmetrically.

Figure 3:
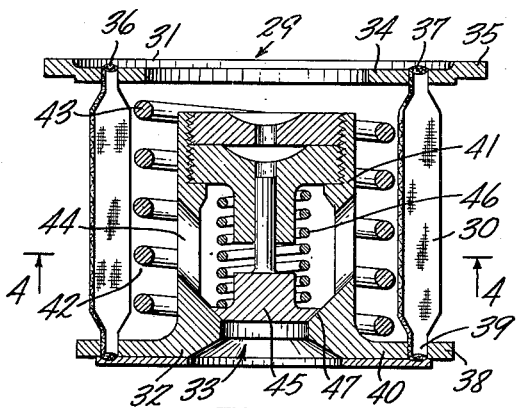
FIGURE 3 is a view in longitudinal section of a filter assembly in which a relief valve includes a body portion having an annular surface which forms one portion of a joint with the filter element.
Figure 4:
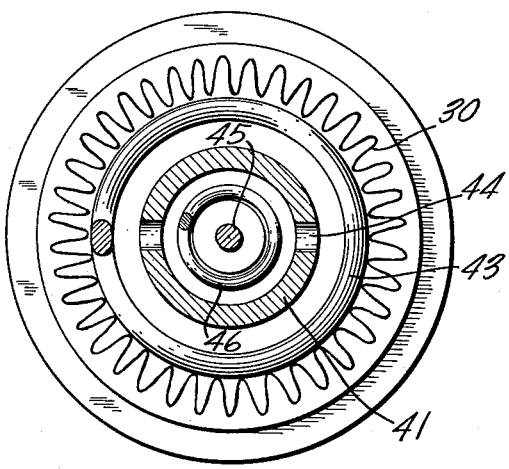
FIGURE 4 is a view in transverse section taken on the line 4—4 of FIGURE 3 looking in the direction of the arrows.

Referring to FIGURES 3 and 4, there is illustrated a filter assembly in which the flow direction is radially inwardly and which in addition includes an integrated relief valve assembly for by-passing the filter element in the event of clogging. The assembly, identified generally by the numeral 29, includes a filter element 30, corrugated longitudinally, and in tubular or cylindrical form as best seen in FIGURE 4, and which supports at one end an apertured end assembly 31 and at its other end an end assembly 32 which includes a poppet-type relief valve indicated generally by the numeral 33. As in the arrangement of FIGURES 1 and 2, the filter element 30 comprises a woven wire mesh preferably formed in accordance with the said copending application Serial No. 562,127.

The end assembly 31 includes inner and outer ring elements 34 and 35, between the radially opposed surfaces of which is disposed the compressed or compacted end 36 of the filter element 30, the three elements being united by a weld 37. The end assembly 32 includes an outer ring 38 and, radially inwardly from the end 39 of the filter element 30, an inner ring 40 which is integral with the body portion 41 of the poppet valve 33. The valve body 41 is smaller than the inside diameter of the tubular filter element 30 and in the toroidal clearance space 42 therebetween is disposed a helical coil or spring element 43 having for its purpose to back up the filter element 30 against radial compression in the event of extreme stresses. The valve body is formed with side openings 44 communicating with the center space in which the valve element 45 is slidably mounted and urged by a spring 46 against a valve seat 47.

The assembly 29 is adapted to be mounted in a hydraulic system so that the fluid flow passes radially inwardly through the filter element 30 and out through the center of the ring 34 of the end assembly 31. Inlet pressure is also applied against the valve element 45 so that in the event the filter element 30 for any reason becomes partially or fully clogged, the valve can unseat and allow the free passage of fluid through the opening 44 in the valve body and outwardly through the center of the ring 34 at the end of the assembly.

Referring to FIGURES 5 and 6, there is shown a filter assembly designed for use as in in-line filter for hydraulic fluid for operation at pressures in the range of 1500 p.s.i. with a flow rate of approximately 1½ gallons per minute with a filtration efficiency of about 5 microns. The assembly, identified generally by the numeral 48, includes a thick-walled inlet housing or sleeve 49 having an inlet connection adapter 50 at one end and formed with internal threads 52 at its other end to receive an outlet connection adapter 52a which in turn supports at its inner end and in cantilever fashion a filter sub-assembly indicated generally by the numeral 53.

The filter sub-assembly 53 is mounted on a machined, tubular shank 54 which is formed integrally with the outlet connection adapter 52a, the machined shank 54 including a series of grooves 55 machined in its outer cylindrical surface. At the base of each groove at four equi-distant points about its circumference are holes 56 entering an axial throughbore 57 which comprises the outlet channel of the assembly.

Surrounding the shank and abutted against a shoulder 58 of a ring portion 59, formed integrally with the shank, is a cylindrical, uncorrugated single layer filter element 60 formed of woven wire mesh. Surrounding the filter element 60 is a second filter element 61 in the form of a corrugated, cylindrical woven wire mesh, the ends 62 and 63 of which are crimped or compressed to form dense edges. As can be seen in FIGURE 5, the compression of the edges 62 and 63 affords a flat inner surface along the length of the element 61 and coextensive with the maximum amplitude of the corrugations which extend inwardly. The flat end extends beyond the shoulder 58 to overlie the ring 59. The joint is completed by means of an outer ring 64, with the three elements 64, 63 and 59 being joined by a weld 65 in a liquid-tight seal. At its other end the filter element 61 and in particular its compressed end 62 is embraced by an outer ring 66 and, on its inner surface, by the single layer filter element 60, followed by an inner ring 67 formed integrally with the shank 54. The ring 66, the compressed end 62, the filter element 60, and the inner ring 67 are all integrated by a common large weld 68. The open end of the outlet channel 57 is closed by a cap plate 69 secured by a weld 70, for example, to the shank 54.

Fluid flows in the inlet connection adapter 50 and around the closed-off end of the filter sub-assembly 53 to pass, sequentially, through the corrugated filter element 61, the single layer filter element 60, the channels 55 and the holes 56 to the outlet channel 57. In this fashion, all of the fluid is forced through the filter element and any leakage which might occur through the threaded connection between the outlet connection adapter 52a and the body portion 49 of the unit is blocked by the sealing action of an O-ring 71.

Referring to FIGURE 7, the invention is illustrated as embodied in a fuel filter assembly indicated generally by the numeral 72. The assembly includes a central tubular portion 73 over which is fitted a one piece body portion 74 to rest at its lower end on a positioning shoulder 75 on the tubular member 73. Adjacent the shoulder 75 the lower edge of the body portion 74 meets a radially enlarged portion of the tubular member in a tight sliding connection which is sealed by an O-ring 76 so that the wall of the tubular portion 73 at its lower extremity and the surrounding wall of the lower portion of the body 74 define a closed sump space 77. Fitted between the tubular member 73 and the body portion 74 above the sump 77 is a filter sub-assembly indicated generally by the numeral 78 which rests at its lower end on a shoulder 79 formed on the inside wall of the body portion 74 approximately midway between the ends.

The filter sub-assembly 78 includes a filter element 80 in the form of a woven wire mesh, which is preferably treated in accordance with said copending application Serial No. 562,127 and formed into relatively deep corrugations, on the order of approximately ½ inch running axially of the unit and taking the general cylindrical or tubular form of the filter elements described above. The upper and lower ends 81 and 82 respectively of the filter element 80 are symmetrically compressed as by crimping. The lower end 82 is fitted between an outer ring 83 and an inner ring 84, the three being joined by a weld 85. Joined to the inner ring 84 is a holding and sealing flange 85a which is formed at its inner edge, radially speaking, with a sealing channel 86 carrying an O-ring 87 which bears tightly against a radially enlarged wall section 88 of the tubular portion 73. The upper end 81 of the filter element 80 is secured between a metal outer ring 89 and a metal inner ring 91 by a weld 91a. The inner ring carries a sealing flange 92 formed at its inner edge with a circular sealing channel 93 containing an O-ring 94 which bears in sealing relationship against a radially enlarged section 95 on the upper end of the center tubular portion 73.

The upper end of the center tubular portion 73 is also internally threaded to receive a cap assembly indicated generally by the numeral 96 having a depending outer flange 97 internally channelled to receive an O-ring 98 which bears against the outer wall of the body portion 74. The cap portion 96 includes an inlet opening 96a, an outlet opening 96b diametrically opposite thereto, and between the inlet and outlet openings is a central valve chamber 99 including a valve element 100 urged by a spring 101 against a valve seat 102.

In operation, the influent flows in the opening 96a downwardly to a deflection slot 103 and down the inside surface of the wall of the body portion 74 along the length of the filter element 80, first filling the sump 77 and then forcing its way radially inwardly through the filter element 80 and through vertical slots 104 in the upper end of the tubular member 73 into the valve chamber 99 and through openings (not shown) in the spider 105 which supports the valve 100, into the outlet 96b.

All of the configurations described above should, after assembly, be subjected to the "Bubble Point Test" described in copending application Serial No. 625,444, filed November 30, 1956. Any holes larger than the desired maximum value which show up during the bubble point test should be repaired by application of a liquid or paste resinous material, or by other suitable means, to the area at which the bubble appears. After the applied sealing material has been set, by heating or other means, the filter element may be rechecked by the bubble point method to verify that it has no holes larger than the predetermined maximum. The sealant material used must be one which is compatible with the conditions of use. Sealants used include synthetic resins, glasses and glass-like materials, hard or soft solder, welding, and sprayed-on metal coatings.

A modification of the tubular structures described above utilizing the structural rigidity of corrugated wire screen and incorporating the high dirt capacity and fine particle filtration of fiber mats is obtained by forming a corrugated sandwich filter element 108 of the type illustrated in FIGURE 8. In this embodiment, a suitable mat 109 of Fiberglas or other non-absorbent fiber material is sandwiched between two wire mesh screens 110 and 111. This sandwich is corrugated, compressed at its ends, formed into a tubular structure, and mounted between end pieces in the manner described above to form an integral self-supporting tubular filter element.

In order to provide maximum dirt capacity in filters of this type, the fiber mat 109 is preferably of the unbonded type. If desired, the sandwich can be prepared by inserting a bonded fiber mat between the wire screens 110 and 111 and dissolving out the bonding material after the integral tubular structure has been formed. However, inasmuch as unbonded fiber mats tend to release fiber particles into a fluid flowing through them, the wire screen on the downstream side of the filter must have a pore structure arranged to block the passage of these fibers. Accordingly, in the illustrated example of FIGURE 8 wherein the fluid flows in the direction of the arrows, the downstream screen 110 is prepared in accordance with the above mentioned copending application Serial No. 562,127 to provide a filter screen with extremely fine pores having a high degree of uniformity of pore size. Furthermore, if desired, the downstream screen 110 may be prepared from a twilled "Dutch" weave to provide non-linear pores, thereby preventing the passage of fibers.

Figure 9:
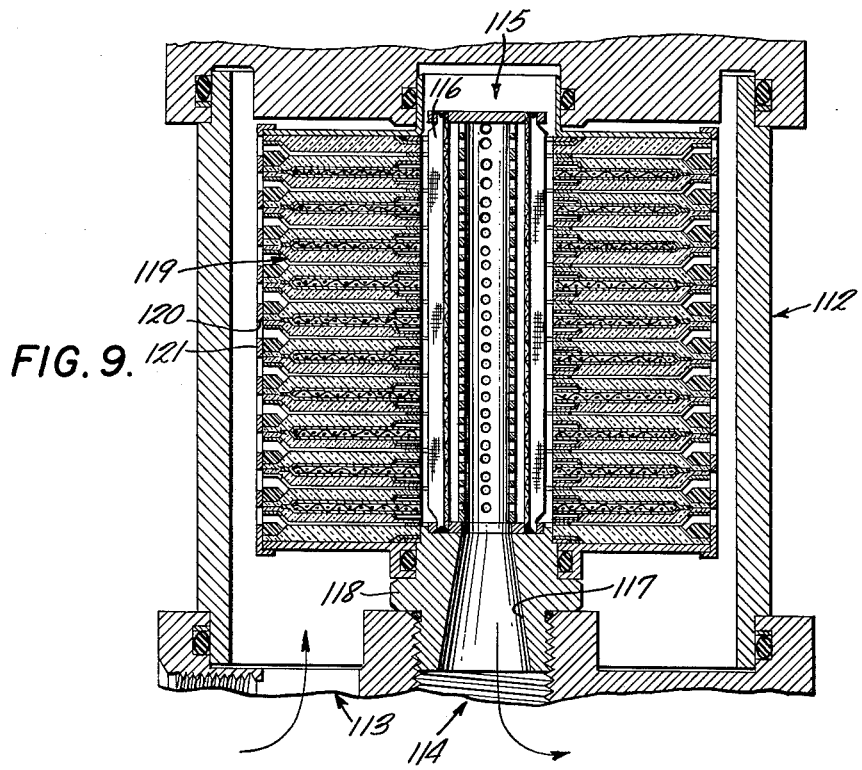
FIGURE 9 is a view in longitudinal section of another form of tubular filter structure.

Substantially increased filter capacity for the cleaning of hydraulic oil and the like may be obtained by surrounding a tubular filter of the type described above with an annular fibrous mat structure, as illustrated in FIGURE 9. This embodiment of the invention comprises a cylindrical housing 112 having an inlet opening 113 admitting fluid to the outer portion of the filter and an outlet opening 114 to carry fluid away from the center of the housing. Centrally mounted within the housing, a unitary tubular filter structure 115 having a corrugated wire screen 116, arranged as previously described, is sealed at one end and communicable through a passage 117 in a support member 118 with the outlet opening 114 at the opposite end of the structure.

Figure 10:
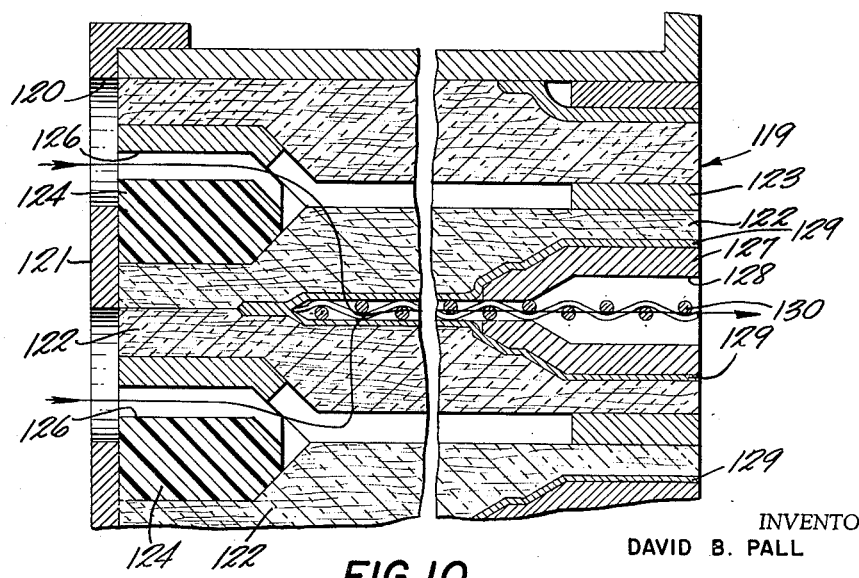
FIGURE 10 is an enlarged sectional view of the filter element shown in FIGURE 9.

Surrounding the tubular filter structure 115, a fiber mat filter pack 119 receives fluid through apertures 120 in a peripheral cylinder 121, the fluid being transmitted inwardly through the pack to the centrally located structure 115. As best seen in FIGURE 10, the filter pack 119 comprises a succession of annular layers 122 of low density fibrous material, the layers being spaced in pairs by inner and outer separators 123 and 124, respectively. In order to admit fluid to the spaces between the pairs of layers, the outer separators 124 are formed with passages 126 communicating with the apertures 120 in the cylinder 121 while at the inside of the filter pack outlet separators 127, inserted between each pair of pads 119, form outlet openings 128 to carry fluid from the pads into the interior of the filter.

In order to provide extraordinarily fine filtration of fluids, the fiber pads 119 are preferably made of finely divided quartz fibrous mat or the like with no binder, the fibers having an average diameter of about 0.75 micron. Although the pads 119 are preferably made of quartz fibers, it will be readily apparent that fibrous mats of any vitreous material or even non-vitreous materials, such as asbestos, will serve equally well in many applications. Utilizing pads of this type, considerably more than 99% of all solid particles down to one micron in diameter can be removed from a fluid on a single pass through the filter. Being an unbonded medium, however, the fine vitreous fibers in the pads 119 tend to migrate downstream. In order to block these fibers, fluid from each of the pads is passed through a membrane-type filter pad 129 composed of a cellulose ester, such as cellulose acetate or cellulose nitrate, and having a maximum pore opening of about three microns, for example. In addition to providing a quantitative removal of fibers from the pads 119, the cellulose ester membranes in themselves provide a high degree of filtration. Between each pair of membrane filters 129, a filter screen 130 conducts fluid therefrom to the outlet openings 128. Preferably, in order to provide passages having a tortuous non-linear path to trap any fibers which might emerge from the membrane filter 129, the filter screen 130, as well as the tubular screen 116, is of the "Rigimesh" type, prepared in accordance with said copending application Serial No. 562,127.

The selection of the optimum low density quartz fibrous mat and the membrane filter with respect to each other may be made by running tests in which membrane filters of various porosities are tested in conjunction with a given fibrous mat. The pressure rise across each component is determined separately as contaminated fluid is passed through the assembly. The membrane-type filter is chosen in such a way that about one-half to seven-eighths of the pressure rise occurs across the fibrous mat, with the remainder occurring across the membrane filter. In this way, both components of the system operate in cooperation with each other to provide an assembly of extremely high dirt capacity, and with a doubly insured removal of all particles larger than three microns, since both mats in fact quantitatively remove particles above this level. It should also be noted that whereas the membrane-fibrous pad combination has an extremely high dirt capacity, the membrane pad, if used alone, would have a very low dirt capacity, since membranes are essentially surface-type filters rather than depth-type filters.

In operation, fluid applied to the inlet opening 113 passes through the apertures 120 in the peripheral cylinder 121 and through the passages 126 to the finely divided vitreous fiber pads 122. As indicated by the arrows in FIGURE 10, the fluid passes through these pads, which remove impurities therefrom, and through the membrane filter 129 which traps fibers migrating from the pads 119. Any particles larger than three microns and practically all of the particles smaller than this, which manage to pass through the fiber pads 119, are trapped by the membrane filter 129, while any fibers carried from the membrane filter are blocked by the wire screen 130 and the corrugated mesh 116 so that highly purified fluid emerges from the outlet opening 114.

While representative embodiments of the invention have been illustrated in the accompanying drawings and described in the specification, it will be understood that the invention can take other specific forms and arrangements. Thus, the filter elements, which are shown as being generally cylindrical in the illustrated embodiment, can range between the cylindrical shapes shown and a substantially flat, disc shape, including all intervening stages of conical shape. In general, in order to effect a sound, welded joint between the mesh material and the ring assemblies, it is essential that the corrugated metal be crimped to compact or densify the end portions to achieve a density of material which is not less than 35% of the density of the metal of which the wire making up the mesh is made. Also, the depth of the corrugations in relation to their spacing should be correlated with the fiber stress of the wires of which the mesh is made. For a range of corrugation depths of say 0.075 to 0.75 inch, which is a useful range for most applications, the thickness of the mesh material should range correspondingly from 0.006 to 0.012 inch, the latter being a more open weave. Accordingly, the invention should not be regarded as limited except as defined in the following claims.

I claim:

1. A filter adapted to withstand high pressures and temperatures comprising a corrugated wire mesh filter element of generally cylindrical configuration, the corrugations extending along the axis of the cylinder, the mesh having flattened and densified end portions at opposite ends of the element, the end portions having a density of at least 35% of the density of the metal wires of the mesh, and inner and outer ring pieces embracing and welded to said flattened portions at each end of the element, at least one of the inner ring pieces having an opening communicating with the interior of the element.

2. A filter in accordance with claim 1 in which both of the inner end pieces have such openings, and one of said openings is closed with an end plug.

3. A filter in accordance with claim 1 in which the wire mesh comprises interwoven wires sintered together at their crossover points to increase rigidity.

4. A filter in accordance with claim 1 in which the flattened portions are offset so as to be adjacent the extreme amplitude at the inner side of the corrugations of the wire mesh.

5. A filter in accordance with claim 1 in which the filter element includes a second wire mesh of generally cylindrical configuration also welded between said inner and outer end pieces.

6. A filter in accordance with claim 5 in which the second layer is corrugated in parallel with the first.

7. A filter in accordance with claim 1 which includes an internal support abutting the inner face of the corrugations and extending from one inner end piece to the other.

8. A filter in accordance with claim 5 which includes a layer of unbonded glass fibers enclosed between said wire mesh layers, the meshes having a sufficiently small pore diameter to retain the glass fibers therewithin.

9. A filter in accordance with claim 8 in which at least one of the wire meshes comprises interwoven wires sintered together at their crossover points to increase rigidity.

10. A filter unit comprising a filter in accordance with claim 1 and, surrounding said filter, a plurality of assembled layers each comprising a mat of unbonded glass fibers, spacing means on one side of each mat forming a passage between adjacent pairs of mats to admit fluid therein, membrane filter means on the other side of each mat, blocking passage of fibers from the mat, and spacing means between adjacent pairs of mats supporting said membrane filter means and providing a passage for filtered fluid from the mats to the filter of claim 1.

11. A filter in accordance with claim 10 wherein the glass fibers of the mats are finely-divided and have an average diameter of less than 5 microns.

12. An all-metal filter unit comprising a metallic body portion having inlet and outlet passages, and, attached to said body portion across the line of flow of fluid from the inlet to the outlet passage, a filter in accordance with claim 1, the filter being sealed to said body portion.

References Cited in the file of this patent

UNITED STATES PATENTS

| | | |
|---|---|---|
| 445,224 | Knight | Jan. 27, 1891 |
| 1,116,234 | Brown | Nov. 3, 1914 |
| 1,279,611 | Timmins | Sept. 24, 1918 |
| 1,303,438 | Wiehl | May 13, 1919 |
| 2,108,798 | Dalrymple | Feb. 22, 1938 |
| 2,145,535 | Vokes | Jan. 31, 1939 |
| 2,212,318 | Gee | Aug. 20, 1940 |
| 2,278,603 | Williams | Apr. 7, 1942 |
| 2,463,825 | Strassheim | Mar. 8, 1949 |
| 2,464,921 | Chandler | Mar. 22, 1949 |
| 2,508,976 | Tessmer | May 23, 1950 |

(Other references on following page)

UNITED STATES PATENTS

| | | |
|---|---|---|
| 2,548,965 | Gaugler | Apr. 17, 1951 |
| 2,640,789 | Hausner | June 2, 1953 |
| 2,693,281 | Winzen | Nov. 2, 1954 |
| 2,701,062 | Robinson | Feb. 1, 1955 |
| 2,730,241 | Thomas | Jan. 10, 1956 |
| 2,801,751 | Thomas | Aug. 6, 1957 |
| 2,925,650 | Pall | Feb. 23, 1960 |

FOREIGN PATENTS

| | | |
|---|---|---|
| 497,020 | Great Britain | Dec. 12, 1938 |
| 932,849 | France | Dec. 1, 1947 |

OTHER REFERENCES

"Materials and Methods," vol. 41, April 1955, pages 98–101.